April 27, 1948.  A. KÉGRESSE  2,440,588

CONTROLLED FREEWHEELING MECHANISM

Filed March 22, 1938

INVENTOR
ADOLPHE KÉGRESSE
By Young, Emery & Thompson ATTORNEYS

Patented Apr. 27, 1948

2,440,588

UNITED STATES PATENT OFFICE 2,440,588

CONTROLLED FREEWHEELING MECHANISM

Adolphe Kégresse, Paris, France

Application March 22, 1938, Serial No. 197,521
In France April 20, 1937

Section 3, Public Law 690, August 8, 1946
Patent expires April 20, 1957

14 Claims. (Cl. 74—336.5)

It is known that in certain change speed gears used more particularly in automobiles and in industry, free wheeling mechanisms or overrunning clutches are made use of. The latter permit the satisfactory realisation of either automatic or non-automatic change speed gears. Nevertheless their application at least in change speed gears in spite of the undisputed advantages which they present is not as general as would be expected. This is due to the fact that the free wheeling mechanism presents the grave defect of doing away with the "retro," that is to say, the driving of the engine by the vehicle. Each time the propulsion is interrupted by releasing the accelerator, the engine slows down, independently of the speed of the vehicle. The part of the free wheeling mechanism connected to the engine rotates in this case at a slower speed than the part connected to the transmission of the vehicle.

This difference of speed is all the greater when the free wheeling mechanism in operating is mounted on a lower speed stage. Thus, in the first speed, for example, in a normal vehicle running "on its own" at 15 kms. per hour, the engine in slowing down rotates at about 300–400 R. P. M., as also the corresponding portion of the free wheeling mechanism, whilst the part of the free wheeling mechanism connected to the transmission of the vehicle rotates at 1500–2000 revolutions per minute according to the ratio of the trains of gears in engagement.

The two parts of the same free wheeling mechanism thus rotate, in the case of a vehicle running on its own, at speeds the difference of which may be considerable and, under certain conditions, attain more than 4,000 revolutions per minute.

It will be easily understood that under these conditions when it is desired to "pick-up," that is to say, when it is necessary to cause the vehicle to be driven by the engine, the driver cannot effect without a shock the coupling of the two parts of the free wheeling mechanism in question, especially in a town, where the "free wheeling" and the "pick-up" are very frequent and must be rapid.

The present invention has for its object to remove this serious defect and to permit the control of the free wheeling mechanisms at the desired moment, principally in their use with change speed gears, automatic or otherwise, on automobile vehicles.

To this end, there is utilised a fluid which may be the same as that used in the change speed gear.

In the case of for example a mechanical change speed gear there may be used for the fluid a small pump designed for the purpose. For change speed gear operating by electricity, this latter fluid will quite naturally be used in the device according to the invention and if it is a question of a change speed gear with hydraulic control, the same fluid will be used without having to use a separate source of pressure.

The invention comprises the combination with a known free wheeling device of a small controlling clutch of only sufficient power to ensure the running of the engine when idle. This small clutch is actuated automatically in a manner which also forms the subject of the invention, preferably by the fluid employed in the change speed gear.

Numerous modifications of the device proposed may be carried out. The annexed drawings show an example of a controlled free wheeling device and an application to a controlled automatic change speed gear of known type.

Figure 1:
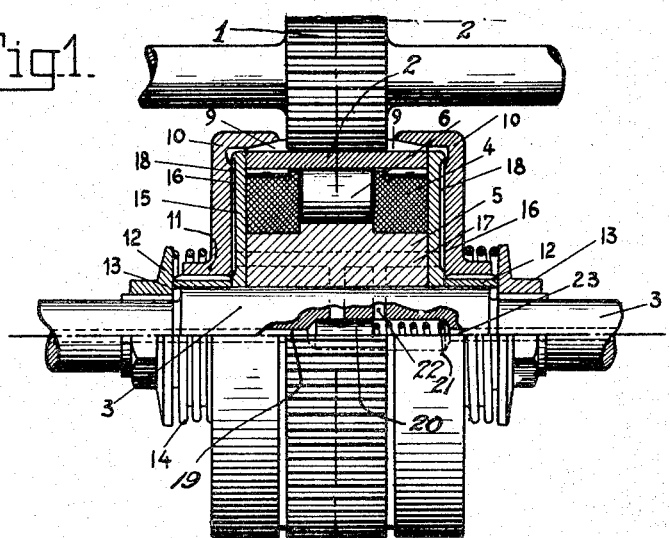
Figure 1 is a view in elevation and partial longitudinal section of a controlled free wheeling mechanism, designed according to the invention.
Figure 2:
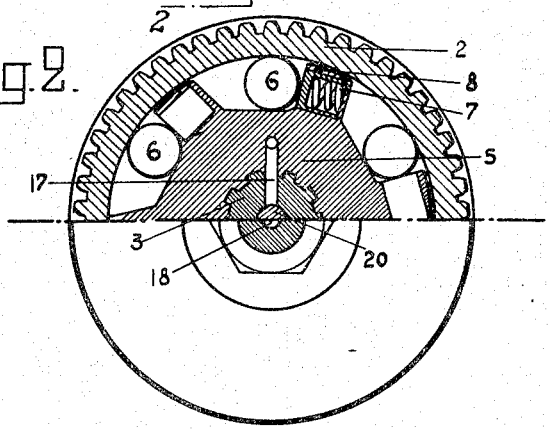
Figure 2 is a side view of the device shown in Figure 1 in half section on the line 2—2 of Figure 1.

In the device shown by Figures 1 and 2, the free wheeling mechanism is mounted in the interior of a toothed rim 2 receiving its motion from a driving shaft having a driving pinion, indicated diagrammatically by 1.

This pinion engages with the toothed rim 2, the shaft 3 of which may be the secondary shaft of a gear box.

The toothed rim 2 is supported by two needle bearings 4 mounted on the shaft 3 and arranged on each side of a free wheel hub 5 of usual construction, integral with the shaft 3. This hub carries the wedging rollers 6 applied against the interior of the rim 2 by the spring 7 located in the arms 8 of the hub 5.

The rim 2 on each side of its teeth comprises a conical portion 9 on which fits a female conical part 10. The hub 11 of the conical part 10 is adapted to slide on the channels of a sleeve 12 itself fixed by a spline and nut 13 on the shaft 3. The nut 13 also serves as a support for a spring 14, of suitable force, the other extremity of which bears on the female cone 10. The latter is thus resiliently urged into engagement with the conical part 9 of the rim 2.

A circular plate 15 fixed by the sleeve 12 and the nut 13 against the needle bearings 4, serves on one face, as a lateral stop for the rim 2 and carries on its other face a diaphragm 16 fixed thereon with a tight joint, at the centre by the clamping of the sleeve 12 and at the periphery by crimping, soldering or any other means. Conduits 17 place the annular spaces 18, comprised between the diaphragms 16 and the plates 15, in communication with a central conduit 19. The latter is connected to a fluid distributor independent of the free wheeling mechanism.

A valve 20 held on its seat by a spring 21 is adapted to interrupt the communication between the central conduit 19 and the channels 17.

Another conduit 22 opens at the back of the valve 20 and is placed in communication with the exterior by a second central conduit 23.

The operation of this device is as follows:

When at rest, the fluid pressure being nil, the parts 10 are pressed against the conical parts 9 by the springs 14 and the whole forms a single block.

When running and as long as the engine actuates the gear constituted by the pinion 1 and the rim 2, the latter will drive the shaft 3 by wedging of the rollers 6 of the free wheeling mechanism and also, but to a small extent, by the cones 9 and 10 in engagement, due to the springs 14.

In this condition of running, the spring 21 is sufficiently strong to prevent the pressure of the fluid in the conduit 19 from opening the valve 20. The diaphragms are not filled with fluid and springs 14 continue to urge the cones 9 and 10 into engagement and the whole system forms a single block as when at rest.

When, however, the vehicle runs faster than the engine propels it so that the movement of the vehicle tends to drive the engine, the pressure between the cones 9 and 10 remains sufficient to ensure the connection between the shaft 3 and the rim 2, thus driving the idly running engine.

It is to be noted that the driving of the engine by the vehicle necessitates only a very little power and that, consequently, the cones need only be slightly pressed together to ensure this driving.

When, conversely, the engine drives the vehicle with the whole of its power, the cones not being able to transmit the load will slide by a few degrees until the rollers 6 of the free wheeling mechanism wedge the hub 5 and the rim 2.

The change of speed, in a change speed gear for example controlled hydraulically, taking place by variation of pressure, the highest pressure corresponding to the highest speed, it follows that at the moment of placing a train of gears in action giving the shaft 3 a speed greater than that obtained by the gearing 1 and 2, the pressure of the fluid will be stronger and will become sufficient to open the valve 20, the spring 21 of which has been gauged to this end. The fluid will thus flow through the conduits 19 and 17 into the annular space 18 and will exert on the diaphragms 16 a pressure which will be transmitted to the female cone parts 10. The latter by compressing the springs 14 will become detached from the male cones 9, thus permitting the free wheeling mechanism to act normally.

It will be noted that the valve 20 in moving under the pressure of the fluid, will obstruct the evacuation conduit 22, uncovering it again as soon as the pressure falls below the selected amount, thus permitting the evacuation of a portion of the fluid contained in the annular chamber 18, under the action of the pressure of the spring 14.

Naturally the diaphragms 16, provided in the example chosen may be replaced by annular pistons of suitable dimensions without departing from the invention.

In the same way in the case of a change speed gear with magnetic plates, naturally the diaphragm 16 will be replaced by a suitable electromagnet. In this case, the operation may be reversed, that is to say, that the electromagnet will apply the cones one on the other and the spring will then be disposed in the interior of the female cone to force it away from the male cone as soon as the current is interrupted.

Figure 3:
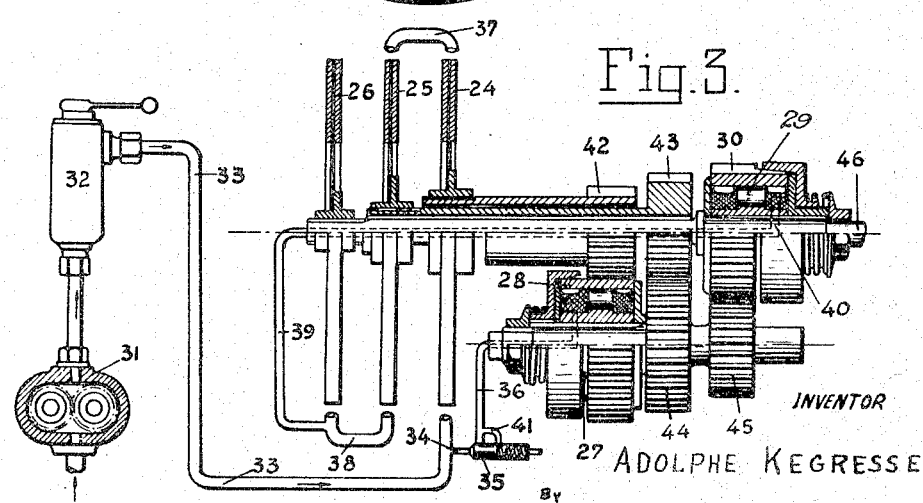
Figure 3 shows diagrammatically the device shown in Figures 1 and 2 in a change speed gear of three speeds, as also the arrangement of the feed device.

It is evident that the double cone clutch shown may quite as well be a single cone (as is shown on Figure 3).

This clutch may also be of the type with single or multiple disc, band, segments, or the like. The variety of the possible embodiments is very large and their application to the invention presents no difficulty.

It is obvious also that the valve 20 and its spring 21, here shown in the interior of the shaft 3, may equally well be arranged on the outside, as in Figure 3, so as to be more accessible.

The distribution of the control fluid constitutes one of the subjects of the invention, as already mentioned.

This distribution is combined, in the example selected, with that of the fluid controlling the changes of speed, for example of the nature of that described in the specification of the United States application No. 124,308 of February 5, 1937, now Patent No. 2,143,321.

In Figure 3 is shown diagrammatically and by way of example, a change speed gear with three speeds of which one is by direct engagement. Each speed, as in the above-mentioned patent, comprises a clutch here shown by the discs 24 for the first speed, 25 for the second speed and 26 for the third or direct engagement.

A controlled free wheeling mechanism 27, of the type described but with a single cone, is mounted on the toothed rim 28 of the first speed gearing. A second controlled free wheeling mechanism 29 also here represented by a single cone, is provided on the rim 30, actuated by the secondary shaft.

The fluid is supplied to the change speed gear by the pump 31, here shown of the gear type, which delivers it into a pressure corrector 32 of known type (United States application No. 145,142 of May 27, 1937, now Patent No. 2,153,926).

From the corrector, the fluid passes to the first speed clutch through the conduit 33. A branch 34 is made in this conduit to carry the fluid, through a spring loaded valve 35 and the tube 36 to the free wheeling mechanism 27 of the first speed.

From the clutch 24 of the first speed, the fluid passes into that of second speed indicated by 25, through the conduit 37 here shown diagrammatically, and then into the third speed clutch shown at 26, through the conduit 38, also shown diagrammatically. A tapping 39 is made on the supply of the third speed, to convey the fluid to the controlled free wheeling mechanism 29 through the conduit 40.

The operation of this device is as follows:

In first speed the fluid is kept at low pressure by the corrector 32 either automatically or by hand (United States application No. 145,142 of May 27, 1937, now Patent No. 2,153,926), and supplies only the first speed. The discs 25 and 26 are free. The valve 35 is closed and places in communication with the atmosphere, through the branch 41, the diaphragm of the free wheeling mechanism 27. The two free wheeling mechanisms 27 and 29 are thus clamped, no pressure seeking to compress the spring 14 (Figure 1). The engine thus operates in first speed, without the intervention of the free wheeling mechanisms as in a vehicle with ordinary change speed gear.

When the pressure of the fluid rises and attains the value of operation of the second speed, the valve 35 opens and allows the passage of fluid under pressure to the controlled free wheeling mechanism 27, which it frees at almost the same time as it acts upon the disc 25, driving the toothed wheels 43 and 44. Through the pinion 45 which engages with the rim 30 of the controlled free wheeling mechanism 29, the receiver shaft 46 is driven with the ratio of the second speed. Only the clutch disc 26 remains free, and rotates at the speed of the shaft 46. The stage of first speed operates with free wheeling. The shaft 46 is coupled with the second speed driving shaft to be driven thereby through the free wheeling mechanism 29, and the conical clutch device of the free wheeling mechanism serves to transmit motion from shaft 46 to the second speed shaft.

When the pressure attains the value of the third speed, the fluid flows through the piping 38, on the one hand into the third speed clutch where it couples the disc 26 directly with the engine, and on the other hand through the piping 39 and 40 into the clutch actuating diaphragm of the free wheeling mechanism 29, and disengages the small clutch to permit normal operation of the free wheeling mechanism 29. The shaft 46 is thus driven directly by the engine.

The normal operation of the free wheeling mechanisms 27 and 29 remains assured as long as the pressure of the fluid retains the value of the pressure of the fluid corresponding to the third speed.

In recapitulation, it is seen that:

1. The locking clutch of the free wheeling mechanism of the first speed is disengaged at a pressure approximately that necessary for the operation of the second speed.

2. The locking clutch of the second speed free wheeling mechanism is disengaged at a pressure approximate to that necessary for the engagement of the third speed, and so on.

The disengagement of the locking clutch of a free wheeling mechanism thus takes place always at a fluid pressure approximating that necessary for the placing in operation of the speed immediately above. In this way, the clamped free wheeling mechanism will always ensure the connection of the vehicle and the engine up to the moment when the higher speed, coming into operation, will in its turn take up this connection, liberating the free wheeling mechanism of the speed immediately below.

I claim:

1. In a fluid actuated change speed transmission, a driven shaft, a fluid actuated clutch associated with said shaft for driving the same, an intermediate speed sleeve surrounding said shaft, a fluid actuated clutch for driving said sleeve, a low speed sleeve surrounding the intermediate speed sleeve, a fluid actuated clutch for driving said low speed sleeve, a counter-shaft, gears on each of said sleeves meshing with cooperating gears on said counter-shaft, cooperating meshing gears on said counter-shaft and driven shaft, free wheeling devices interposed in the drives between said sleeves and the driven shaft, fluid actuated means for effecting the operativeness of said free wheeling devices, means controlling the supply of fluid to said clutches, and means operable upon supplying fluid to said first- and second-mentioned clutches for supplying fluid to the means for effecting the operativeness of the free wheeling devices.

2. In a fluid actuated change speed transmission, a driven shaft, a fluid actuated clutch associated with said shaft for driving the same, an intermediate speed sleeve surrounding said shaft, a fluid actuated clutch for driving said sleeve, a low speed sleeve surrounding the intermediate speed sleeve, a fluid actuated clutch for driving said low speed sleeve, a counter-shaft, gears on each of said sleeves meshing with cooperating gears on said counter-shaft, cooperating meshing gears on said counter-shaft and driven shaft, free wheeling devices interposed in the drives between said sleeves and the driven shaft, fluid actuated means for effecting the operativeness of said free wheeling devices, pressure responsive means for controlling the flow of actuating fluid to said clutches, and pressure responsive means for controlling the flow of fluid to the means for effecting the operativeness of the free wheeling devices, the pressure responsive means of the free wheeling device associated with one speed being responsive to the same pressure as the pressure responsive means of the clutch of the next higher speed.

3. In a fluid actuated change speed transmission, a driven shaft, a fluid actuated clutch associated with said shaft for driving the same, an intermediate speed sleeve surrounding said shaft, a fluid actuated clutch for driving said sleeve, a low speed sleeve surrounding the intermediate speed sleeve, a fluid actuated clutch for driving said low speed sleeve, a counter-shaft, gears on each of said sleeves meshing with cooperating gears on said counter-shaft, cooperating meshing gears on said counter-shaft and driven shaft, a free wheeling device interposed between the counter-shaft and the low speed gear carried thereby, a free wheeling device interposed between the driven shaft and the gear carried thereby, means for locking said free wheeling devices to render them inoperative, and fluid actuated means for releasing said locking means.

4. In a fluid actuated change speed transmission, a driven shaft, a fluid actuated clutch associated with said shaft for driving the same, an intermediate speed sleeve surrounding said shaft, a fluid actuated clutch for driving said sleeve, a low speed sleeve surrounding the intermediate speed sleeve, a fluid actuated clutch for driving said low speed sleeve, a counter-shaft, gears on each of said sleeves meshing with cooperating gears on said counter-shaft, cooperating meshing gears on said counter-shaft and driven shaft, a free wheeling device interposed between the counter-shaft and the low speed gear carried thereby, a free wheeling device interposed between the driven shaft and the gear carried thereby, means for locking said free wheeling devices to render them inoperative, fluid actuated means for releasing said locking means, means responsive to a low fluid pressure for admitting fluid to said low speed clutch, means responsive to an intermediate fluid pressure for admitting fluid to said intermediate speed clutch and the releasing means of said low speed free wheeling device, and means responsive to a higher fluid pressure for admitting fluid to said high speed clutch and to the releasing means of said second-mentioned free wheeling device.

5. In a fluid actuated change speed transmission, a driven shaft, a fluid actuated clutch associated with said shaft for driving the same, an intermediate speed sleeve surrounding said shaft, a fluid actuated clutch for driving said sleeve, a low speed sleeve surrounding the intermediate speed sleeve, a fluid actuated clutch for driving said low speed sleeve, a counter-shaft, gears on each of said sleeves meshing with cooperating gears on said counter-shaft, cooperating meshing gears on said counter-shaft and driven shaft, a free wheeling device interposed between the counter-shaft and the low speed gear carried thereby, a free wheeling device interposed between the driven shaft and the gear carried thereby, means for frictionally locking said free wheeling devices to render them inoperative, and fluid actuated means for releasing said locking means.

6. In a change speed device having multiple hydraulically actuated friction clutches driving successive trains of gears and controlled by valves loaded with springs, a free wheeling mechanism, having driving and driven elements, on one of the gears of each train except the train of the highest speed, a clutch frictionally coupling the elements of each free wheeling mechanism together, hydraulically actuated means for disengaging said element coupling clutches and controlled by the operating fluid actuating the multiple hydraulically actuated clutches, and means for admitting the operating fluid to the actuating means of a particular free wheeling element coupling clutch when the pressure of the fluid corresponds to the placing in operation of the speed stage immediately above that with which said particular free wheeling element coupling clutch is associated.

7. In a change speed device having multiple hydraulically actuated friction clutches driving successive trains of gears and controlled by valves loaded with springs, a free wheeling mechanism, having driving and driven elements, on one of the gears of each train except the train of the highest speed, a clutch frictionally coupling the elements of each free wheeling mechanism together, and hydraulically actuated means for disengaging said element coupling clutches and controlled by the operating fluid actuating the multiple hydraulically actuated clutches, the means for admitting the fluid to the actuating means of each free wheeling element coupling clutch comprising a valve loaded with a spring regulated to permit said valve to open when the pressure corresponds to that necessary for placing the immediately higher speed stage in operation.

8. In a change speed device having multiple hydraulically actuated friction clutches driving successive trains of gears and controlled by valves loaded with springs, a free wheeling mechanism, having driving and driven elements, on one of the gears of each train except the train of the highest speed, a clutch frictionally coupling the elements of each free wheeling mechanism together, and hydraulically actuated means for disengaging said element coupling clutches and controlled by the operating fluid actuating the multiple hydraulically actuated clutches, the means for admitting the fluid to the actuating means of each free wheeling element coupling clutch comprising a valve loaded with a spring regulated to permit said valve to open when the pressure corresponds to that necessary for placing the immediately higher speed stage in operation, all of said free wheeling element coupling clutch actuating means below a given speed stage being in fluid communication with each other so that all free wheeling element coupling clutches below said given speed stage will be disengaged when said given speed stage is operative.

9. In a hydraulic change speed transmission having a plurality of speed stages, a separate transmission and hydraulically actuated clutch for each speed stage, said clutches having pressure responsive fluid controlling valves for admitting an operating fluid thereto, a free wheeling mechanism in each transmission below that of the highest speed stage, means for rendering said free wheeling mechanisms ineffective, hydraulically actuated means for rendering those of said free wheeling mechanisms below the speed stage in operation effective, and means for supplying fluid under pressure to said clutches and hydraulically actuated means.

10. In a hydraulic change speed transmission having a plurality of speed stages, a separate hydraulically actuated clutch for each speed stage, a transmission for each speed stage, a free wheeling mechanism in the transmission of each speed stage below the highest speed stage, means for locking said free wheeling mechanisms to render them ineffective, hydraulically acutated means for unlocking said free wheeling mechanisms to render them effective, means for supplying a fluid under pressure to said clutches and unlocking means, a pressure responsive valve associated with each hydraulically actuated clutch for controlling the flow of a fluid thereto, the pressure to which said valves respond being different for the several clutches, and a pressure responsive valve associated with each of said hydraulically actuated means for controlling the flow of fluid thereto, the valve of the hydraulically actuated unlocking means of the free wheeling mechanism of the transmission of a given speed stage and the valve of the hydraulically actuated clutch of the next higher speed stage being responsive to the same pressure.

11. In a hydraulic change speed transmission having a plurality of speed stages, a separate hydraulically actuated clutch for each speed stage, a transmission for each speed stage, a free wheeling mechanism in the transmission of each speed stage below the highest speed stage, means for locking said free wheeling mechanisms to render them ineffective, hydraulically actuated means for unlocking said free wheeling mechanisms to render them effective, means for supplying a fluid under pressure to said clutches and unlocking means, a pressure responsive valve associated with each hydraulically actuated clutch for controlling the flow of a fluid thereto, the pressure to which said valves respond being different for the several clutches, and a pressure responsive valve associated with each of said hydraulically actuated means for controlling the flow of fluid thereto, the valve of the hydraulically actuated unlocking means of the free wheeling mechanism of the transmission of a given speed stage and the valve of the hydraulically actuated clutch of the next higher speed stage being responsive to the same pressure, all of said clutches and hydraulically actuated unlocking means of the free wheeling mechanisms being in fluid communication when their respective valves are open.

12. In a fluid actuated change speed transmission having a plurality of speed stages, a transmission and a fluid actuated clutch for each speed stage, a free wheeling device in the transmission of each speed stage below the highest stage, pressure responsive valves for controlling the actuation of said clutches, said free wheeling devices having driving and driven elements, means for coupling the elements of said free wheeling devices to reversely transmit power through the transmission, fluid actuated unlocking means for disengaging said coupling means, and pressure responsive means associated with each of said unlocking means for controlling the operation of the latter, and means for supplying fluid under pressure to said clutch actuating and said unlocking means.

13. In a fluid actuated change speed transmission having a plurality of speed stages, a transmission and a fluid actuated clutch for each speed stage, a free wheeling device in the transmission of each speed stage below the highest stage, pressure responsive valves for controlling the actuation of said clutches, said free wheeling devices having driving and driven elements, means for coupling the elements of said free wheeling devices to reversely transmit power through the transmission, fluid actuated unlocking means for disengaging said coupling means, pressure responsive means associated with each of said unlocking means for controlling the operation of the latter, and means for supplying fluid under pressure to said clutch actuating and said unlocking means, the pressure responsive means of the free wheeling device of one stage and the pressure responsive valve of the clutch of the next higher stage being responsive to the same pressure.

14. In a hydraulic change speed transmission having a plurality of speed stages, a main clutch and a gear train for each speed stage below the highest, a free wheeling mechanism in each gear train, each free wheeling mechanism having a driving and a driven element, a separate friction locking clutch for frictionally coupling the driving and driven elements of each free wheeling mechanism, means urging said clutches into engagement to render the free wheeling mechanisms ineffective, and means operable upon engagement of the main clutches of speed stages other than the lowest for disengaging the locking clutches in the free wheeling mechanisms of gear trains of lower speed stages to render said last-recited free wheeling mechanisms effective.

ADOLPHE KÉGRESSE.

REFERENCES CITED

The following references are of record in the file of this patent:

UNITED STATES PATENTS

| Number | Name | Date |
|---|---|---|
| 1,248,635 | Duchemin | Dec. 4, 1917 |
| 1,723,925 | Fairchild | Aug. 6, 1929 |
| 1,783,513 | Maurer | Dec. 2, 1930 |
| 1,926,783 | Miller | Sept. 12, 1933 |
| 2,003,212 | Milican et al. | May 28, 1935 |
| 2,090,614 | Clark | Aug. 24, 1937 |
| 2,143,325 | Kreis | Jan. 10, 1939 |

FOREIGN PATENTS

| Number | Country | Date |
|---|---|---|
| 471,852 | Great Britain | Sept. 10, 1937 |